United States Patent Office 3,245,124
Patented Apr. 12, 1966

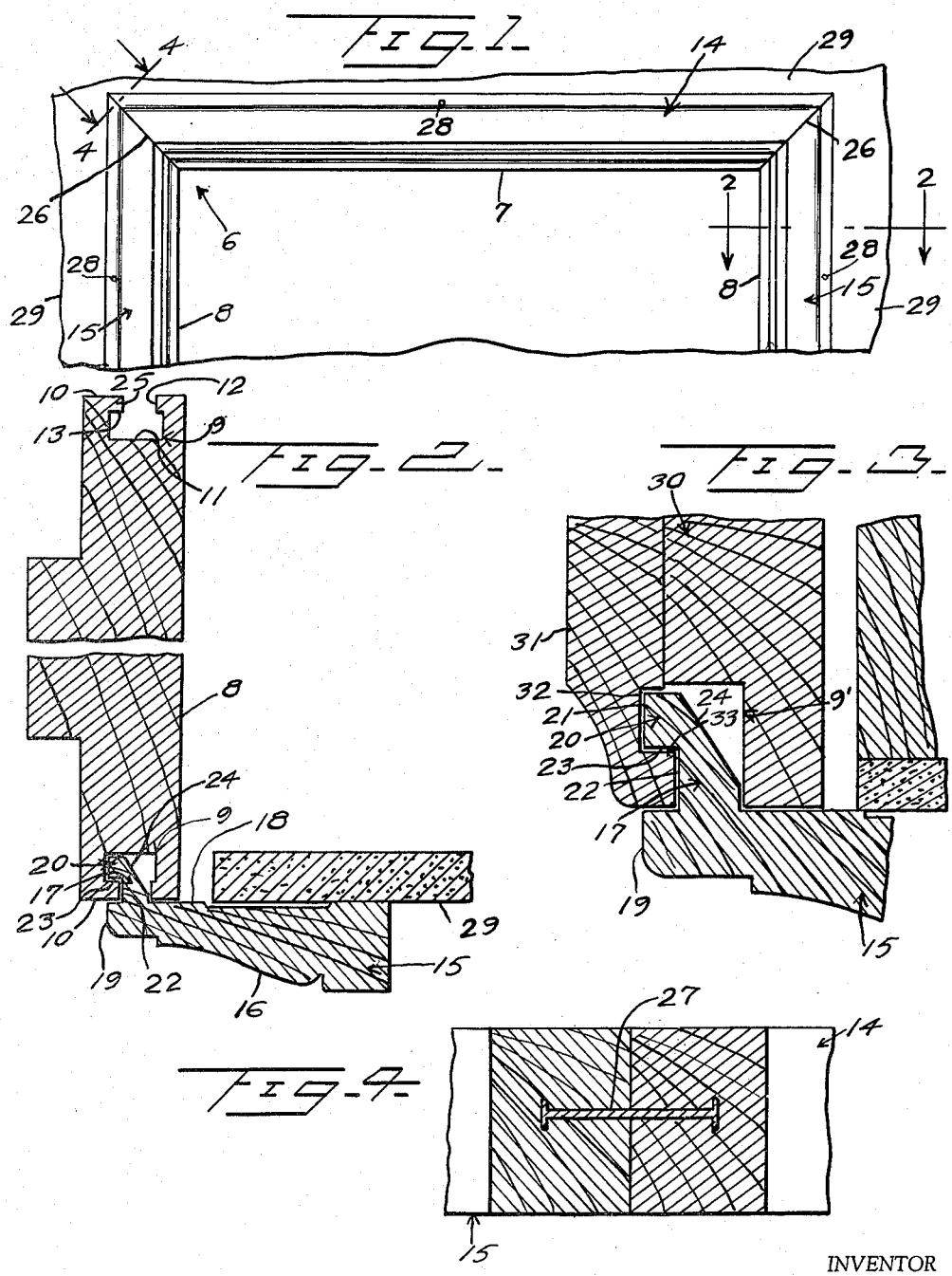

3,245,124
MOLDING FOR DOOR AND WINDOW FRAMES
Wilford B. Faske, R.R. 1, Borden, Ind.
Filed Nov. 22, 1963, Ser. No. 325,529
2 Claims. (Cl. 20—11)

This invention relates to a molding utilized as a finished trim for door and window frames, and more particularly to a novel construction of molding and frame whereby the molding pieces can be attached to the frame without the necessity of utilizing driven fastenings.

Another object of the invention is to provide means for interlocking the molding to the frame and which is especially useful where prefinished and preassembled door and window units are utilized.

Various other objects and advantages of the invention will hereinafter become more fully apparent from the following description of the drawing illustrating a presently preferred embodiment thereof, and wherein:

FIGURE 1 is an elevational view of the upper portion of a door frame and showing the molding attached to one side thereof;

FIGURE 2 is an enlarged fragmentary horizontal sectional view taken substantially along a plane as indicated by the line 2—2 of FIGURE 1;

FIGURE 3 is an enlarged fragmentary cross sectional view, similar to FIGURE 2 but on a larger scale, showing the moldiing attached to an edge of a window frame, and FIGURE 4 is an enlarged fragmentary sectional view taken substantially along a plane as indicated by the line 4—4 of FIGURE 1.

Referring more specifically to the drawing, and first with reference to FIGURES 1, 2 and 4, an upper portion of a door frame, designated generally 6, is shown in FIGURE 1 including the lintel 7 and the upper portion of the two jambs 8. The jambs 8 and lintel 7 are identical in cross section, and one of the jambs 8 is shown in cross section in FIGURE 2 and has a continuous groove 9 extending from end-to-end of each side edge 10 thereof. Each groove 9 includes an enlarged inner portion 11 and a restricted outer portion 12 which opens through the side edge 10. The restricted outer portion 12 is slightly offset relative to the inner portion 11 in a direction away from the inner side of said jamb or frame member to provide a relatively wide shoulder 13 which faces inwardly of the inner groove portion 11.

A top molding strip 14 and parts of two side molding strips 15 are shown in FIGURE 1, said molding strips 14 and 15 being of identical shape in cross section. The molding strips 14 and 15 may have any desired configuration or shape on the outer sides 16 thereof, as best seen in FIGURE 2. Each molding 14 and 15 has a tongue 17 which projects from its inner face 18 adjacent an inner longitudinal edge 19 of the molding and which tongue preferably extends from end-to-end of the molding. As best seen in FIGURE 3, the tongue 17 is hook-shaped in cross section and includes a bill portion 20 which extends laterally thereof and which includes an edge 21 which is disposed substantially in the same plane as the molding edge 19. The bill portion 20 forms a recess or channel 22 in the tongue 17 which opens laterally therefrom between the edges 19 and 21. The inner edge of the bill portion 20, which defines one side of the recess 22, constitutes a shoulder 23 which is disposed substantially parallel to the inner face 18 of the molding strip. The opposite side of the tongue 17 is beveled as seen at 24 from the outermost end of the hook portion 20 to adjacent the inner portion of the tongue which projects from the face 18.

The molding strip 15, as seen in FIGURE 2, is applied to the door jamb 8 by inserting the hook portion 20 of its tongue 17 through the restricted outer groove portion 12, and with the molding strip 15 swung clockwise relative to its position of FIGURE 2, so as to be disposed in a plane at an oblique angle to the edge 10. After the hook portion 20 has passed through the restricted outer groove portion 12 and into the enlarged inner groove portion 11, said molding strip is swung counterclockwise to its position of FIGURE 2, and so that the part 25 of the jamb member 8 will be received in the recess 22 and to position the shoulder 23 of the tongue in a position facing the shoulder 13. The beveled side 24 of the tongue permits this rocking or swinging movement of the molding strip 15 for interlocking the tongue 17 thereof in the groove 9, as seen in FIGURE 2. It will be readily apparent that when thus applied the molding strip 15 cannot be removed from its connection to the jamb 8 without first swinging said strip clockwise from its position of FIGURE 2 relative to the jamb. Since the part of the tongue 17 which extends from the inner face 18 and which fits in the restricted groove portion 12 is disposed between portions of the inner face 18, said face portions will overlie the side edge 10 on both sides of the groove portion 12, whereby the joint between the molding strip and frame element will be concealed.

The other molding strip 15 is applied in the same manner to the other pamb 8 and the molding strip 14 is likewise applied in the same manner to the lintel 7 to provide concealed joints. The molding strips 14 and 15 are mitered at their ends to form mitered corners 26 where ends of the molding strips 15 contact the ends of the molding strip 14.

As seen in FIGURE 4, a conventional spline 27 is driven into each corner 26 from the outer extremity of said corner for securing the molding strips 15 to the molding strip 14 and for holding said molding strips in coplanar relation to one another. Thus, after application of the splines 27 to the two corners 26, the three molding strips 14 and 15 are held by one another against swinging movement relative to the lintel 7 and jambs 8, respectively, to maintain the tongues 17 of said molding 14 and 15 interlocked in the grooves 9 of the lintel 7 and jambs 8.

It will be understood that additional molding strips, corresponding to the molding strips 14 and 15, will be applied in the same manner to the other side edges 10 of the frame members 7 and 8. If desired, one or more nails may be driven through each molding 14 and 15 near its other outer longitudinal edge, and said nails 28 will be anchored in wall members 29 which surround the frame 6. Where the molding strips 14 and 15 are prefinished for use with prefinished and preassembled frame units, the nails 28 may be of the conventional type having heads colored to match the color of the molding strips 14 and 15 and which nail heads do not require setting or the application of putty after placement.

FIGURE 3 shows the trim strip 14 or 15 applied to an edge of a window frame 30 including a window stop 31. A groove 9' is formed partly in the frame 30 and partly in the window stop 31 thereof and the enlarged inner portion of the groove 9' is formed by a recess 32 in the inner face of the window stop 31 and in which the hook portion 20 is received, and which has an inwardly facing shoulder 33 which faces the shoulder 23 and which functions in the same manner therewith as the shoulder 13, to prevent the tongue 17 from being disengaged from the groove 9' without swinging the molding 15 clockwise from its position of FIGURE 3.

Molding strips 14 and 15 and the frame members 7, 8 and 30 may be formed of wood or other materials, and the tongues 17 may be secured thereto rather than forming a part thereof, as illustrated.

Various modifications and changes are contemplated and may be resorted to, without departing from the function or scope of the invention as hereinafter defined by the appended claims.

I claim as my invention:

1. The combination of a frame for an opening of a building wall and a molding attached to said frame, said frame including spaced jamb elements and a header element each having a longitudinal side edge provided with a groove including an enlarged inner portion and a restricted outer portion, said outer portion opening through said edge, a shoulder forming part of said inner portion and facing inwardly thereof; said molding including a molding strip associated with each element, each molding strip including an inner face and an inner longitudinal edge, a tongue projecting from said inner face of each molding strip adjacent the inner longitudinal edge thereof and extending longitudinally of the strip, said tongue being hook-shaped in cross section for interlocking engagement in the groove and including a laterally extending hook portion defining an outwardly facing shoulder disposed to face the shoulder of said groove for interlocking the tongue therein when the inner face of said molding strip is disposed substantially parallel to said edge of the frame, portions of said inner face on opposite sides of the tongue overlying said side edge on both sides of the groove whereby the joints between the frame elements and molding strips are concealed, and said tongue having a beveled side disposed opposite to the hook portion thereof to permit swinging movement of the molding relative to the frame for passage of said hook portion of the tongue through the restricted portion of the groove for engaging the tongue with the groove and for disengaging it therefrom.

2. The combination as defined by claim 1, said molding strips having abutting beveled ends forming mitered corners of the molding, and splines engaging the molding strips at said mitered corners for maintaining the molding strips in coplanar relation to one another to prevent swinging movement of the molding strips relative to the frame.

References Cited by the Examiner

UNITED STATES PATENTS

| | | | |
|---|---|---|---|
| 1,461,440 | 7/1923 | Centerbar | 20—92 |
| 2,174,180 | 9/1939 | Rand | 20—92 |
| 2,430,200 | 11/1947 | Wilson | 20—92.4 |
| 2,453,918 | 11/1948 | Jansen | 20—92 |
| 2,496,184 | 1/1950 | Van Canon | 20—92 X |
| 2,510,243 | 6/1950 | Mohring | 20—92 X |
| 2,766,495 | 10/1956 | Nielsen | 20—92 |
| 2,872,711 | 2/1959 | Killebrew | 20—92 X |

HARRISON R. MOSELEY, *Primary Examiner.*